May 26, 1953      M. TAYLOR      2,639,631

MECHANISM FOR POWER TRANSMISSION

Filed April 8, 1950      2 Sheets-Sheet 1

INVENTOR:
Marvin Taylor

May 26, 1953  M. TAYLOR  2,639,631
MECHANISM FOR POWER TRANSMISSION
Filed April 8, 1950  2 Sheets-Sheet 2

INVENTOR:
Marvin Taylor

Patented May 26, 1953

2,639,631

UNITED STATES PATENT OFFICE 2,639,631

MECHANISM FOR POWER TRANSMISSION

Marvin Taylor, Brooklyn, N. Y.

Application April 8, 1950, Serial No. 154,768

7 Claims. (Cl. 74—751)

This invention relates to power transmission devices in which gyroscopic forces are utilized to produce a resultant torque on a driven shaft.

Many attempts have been made to invent an efficient mechanical power transmission that could successfully be used between a constant speed power source and a variable speed load for appreciable magnitudes of power. I am aware that a number of devices claiming to utilize gyroscopic forces to accomplish the above purpose have been patented. Most of those devices which truly use a gyroscopic torque have been faced with the same problem, namely, after a spinning flywheel has been precessed 180°, there is a change in the direction of the gyroscopic torque that is developed. Previous devices have attempted to overcome this reversal by allowing the gyroscope flywheel to turn about four axes, namely, the spin axis, the precession axis, the power axis, and a fourth axis which keeps the output torque unidirectional. This leads to a complex mechanism which cannot practically deliver appreciable power in a machine of usable size. Furthermore, this complexity leads to a prohibitive manufacturing cost. My invention utilizes the gyroscopic torque in a simple, rugged mechanism, by decreasing the flywheel spin speed during the portion of the precession cycle when the direction of the developed torque is opposite to desired direction. Hence, a number of flywheels, each producing an oscillating torque which is greater in one direction, can be combined to produce a constant unidirectional torque as will be explained in the discussion which follows.

The object of this invention is to provide a simple, efficient, and durable mechanism for transmitting power from a constant speed power source, said mechanism being capable of the following properties:

1. Complete control of the torque on the driven shaft independent of the speed of the driven shaft which may vary within wide limits.

2. Automatic and continuous variation of torque on the driven shaft to accommodate changes in load regardless of the speed of the driven shaft which may vary within wide limits.

Preferred embodiments of my invention will be described with reference to the accompanying drawings forming a part of this specification in which:

Figures 1a, 1b, 1c, and 1d are explanatory diagrams of a gyroscope carried by a driven shaft, in four positions, means for maintaining flywheel spin and precession being omitted.

Figures 2a, 2b, and 2c are explanatory graphs illustrating the relation between torque on the driven shaft and gyroscope position for different situations.

Figure 1A:
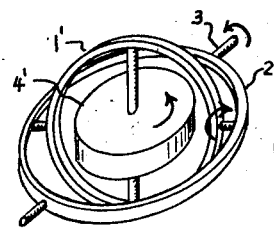
Figure 1B:
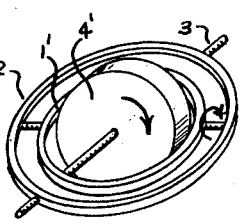

In Figures 1a, 1b, 1c, and 1d, a driven shaft 3 has rigidly attached to it a gimbal 2 in which is pivoted a ring 1' which is free to rotate about an axis at right angles to the axis of the shaft 3. A flywheel 4' is free to spin in bearings in the ring 1', the axis of spin being at right angles to the axis about which ring 1' turns in gimbal 2. The axis of flywheel spin within ring 1' will be known as the spin axis. The axis of rotation of the flywheel supporting member, ring 1', within gimbal 2 will be known as the precession axis. The axis of rotation of gimbal 2 and driven shaft 3 is the power axis. The spin, precession, and power axes cross each other substantially at a common point in the center of flywheel 4'. It will be assumed that flywheel 4' is driven at constant speed in the direction shown by the arrow on it and that the ring 1' is to be rotated about the precession axis at a constant speed in the direction as indicated by the arrow by suitable means not shown. Figures 1a, 1b, 1c, and 1d show consecutive positions as ring 1' is rotated about the precession axis while the driven shaft is held stationary by means not shown. The rotation of ring 1' carrying with it the spinning flywheel 4' will develop a gyroscopic torque about the power axis in the directions indicated by the arrows in the different diagrams. In Figure 1a, the spin axis is at a right angle to the power axis. In Figure 1b, the ring 1' carrying the flywheel 4' has rotated 90° from its position in Figure 1a so that the spin axis and the power axis are co-linear; in Figure 1c, ring 1' and the flywheel have rotated 180° from their position in Figure 1a; and in Figure 1d, ring 1' and the flywheel have rotated 270° from their position in Figure 1a.

Figure 1C:
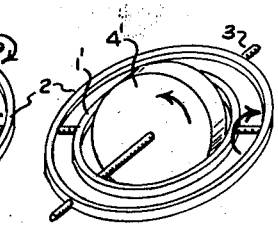
Figure 1D:
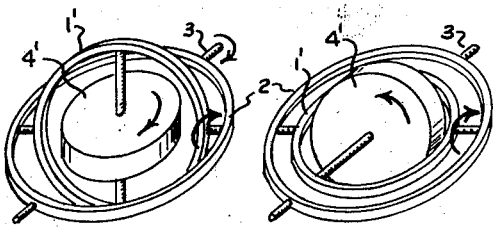

At any position during the precession cycle, the gyroscopic torque about the power axis will be a function of the precession speed and the angular momentum of the flywheel about the axis which is perpendicular to the power and precession axes. In Figures 1a and 1c, this component of angular momentum is maximum in opposite directions, and in Figures 1b and 1d, this component is zero.

Figure 2A:
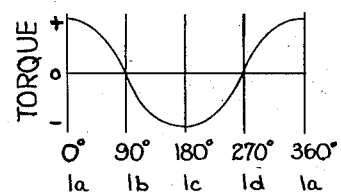

In Figure 1a, the rotation of the spinning flywheel 4' about the precession axis develops a torque about the power axis as shown by the arrow in a direction which may be called positive. As the flywheel approaches the position in Figure 1b, the component of angular momentum perpendicular to the power axis decreases to zero, hence the torque developed about the power axis decreases to zero. As the flywheel moves from the position in Figure 1b to that in Figure 1c, a negative torque is developed about the power axis, i. e., in a direction opposite to that developed in Figure 1a. This negative torque is maximum at the position in Figure 1c, when the spin axis is again at a right angle to the power axis. Between the position in Figure 1c and that in Figure 1d, the magnitude of this negative torque decreases to zero. Between the position shown in Figure 1d and that in Figure 1a, the torque becomes positive, increasing to a maximum at the position in Figure 1a. The nature of this variation of gyroscopic torque about the power axis with position of the flywheel about the precession axis is shown in the graph in Figure 2a in which the ordinate is gyroscopic torque about the power axis and the abscissa is displacement about the precession axis.

Figure 2B:
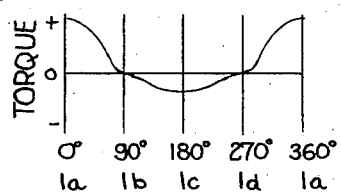

As previously stated, the magnitude of the gyroscopic torque is dependent upon a component of the angular momentum of the flywheel which is the product of the spin speed and the flywheel moment of inertia about the spin axis. It will, therefore, be possible to change the form of the torque variation shown in Figure 2a by changing the spin speed as the flywheel moves through the positions in Figures 1a, 1b, 1c, and 1d. Suppose the spin speed is varied in the following manner: maximum at the position shown in Figure 1a, gradually decreasing as the ring 1' rotates, until the spin speed is minimum at the position shown in Figure 1c; then gradually increasing as the ring 1' keeps rotating until the spin speed is once more a maximum at the position shown in Figure 1a. At the position in Figure 1a, the torque developed along the power axis will be maximum. As ring 1' turns and the flywheel passes through the position in Figure 1b, the direction of the torque developed about the power axis will change. However, the spin speed of the flywheel will be low during this portion of the cycle about the precession axis, hence the magnitude of the torque which is developed in the direction opposite to that in Figure 1a will be less. Generally stated, during that portion of the precession cycle when the torque is positive, the spin speed will be high and during the portion when the torque is negative, the spin speed will be low, thus the positive torque will be greater in magnitude than the negative torque. The variation of the gyroscopic torque about the power axis for the different positions about the precession axis will then take a form such as that shown in Figure 2b.

Figure 3:
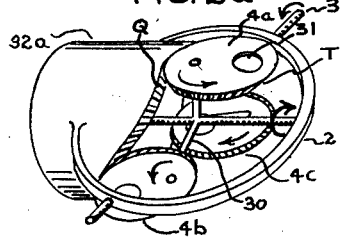
Figure 3 is an explanatory diagram showing three flywheels being carried by a driven shaft, means for maintaining precession being omitted.

The spirit of my invention lies in this non-linear cyclical variation of flywheel spin speed during the processional rotation to obtain a variable torque about the power axis which is greater in one direction. A number of flywheels given this motion and acting together will produce a smooth, unidirectional torque about the power axis. Many different operative connectors could be devised to give this non-linear cyclical variation. Figure 3 shows diagrammatically one way in which this may be done. In Figure 3, the precession member 1 is rotatably supported about the precession axis by gimbal 2. Means for rotating the precession member 1 at constant speed are not shown. Integral with precession member 1 and at the intersection of the power and precession axes are three radially projecting shafts 30, each at a right angle to the precession axis and each spaced 120° from its neighbor about the precession axis. Rotatably supported on each shaft extension 30 are three non-circular flywheels 4a, 4b, and 4c, each having the same shape. The flywheels are equipped along their non-circular circumference with gear teeth. Attached to gimbal 2 is a gear 32a having teeth meshing with the flywheels 4a, 4b, and 4c. The pitch radius of the flywheels is variable from a minimum at point Q as shown on flywheel 4a to a maximum at point T which is diametrically opposite from point Q. Cavities 31 are formed in the flywheels in the vicinity of the larger radius to balance the flywheel about the spin axis. The pitch radius of the bevel teeth on gear 32a about the precession axis is constant. However, the teeth on gear 32a are displaced parallel to the precession axis in order to mesh properly with the teeth on the flywheels.

Figure 2C:
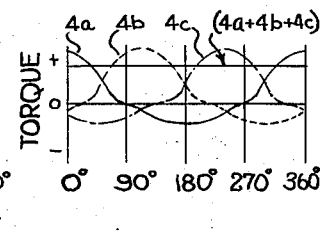

As the precession member 1 rotates at a constant speed about the precession axis, it carries the flywheels about the precession axis. Since the gear 32a does not rotate about the precession axis, the flywheels are forced to rotate about their respective spin axes. The variation of the pitch radius of the flywheels causes the spin speed to vary as the flywheels are carried about. At any position, the spin speed of any wheel will depend upon its pitch radius to the point of mesh with gear 32a and the precession speed. The number of teeth on each flywheel is the same as that on gear 32a; therefore, the non-linear variation in spin speed will be cyclical with respect to the rotation of the flywheels about the precession axis. When point Q is in mesh with gear 32a, the flywheel spin speed will be maximum for the cycle, and when point T is in mesh with gear 32a, the spin speed will be minimum. Point Q on flywheel 4a is the point of mesh with gear 32a at the position shown in Figure 3. When flywheel 4a has moved 180° from this position about the precession axis, point T will be the point of mesh. The developed torque about the power axis due to the gyroscopic effect of flywheel 4a will, therefore, follow a form similar to that in Figure 2b. Each of the other flywheels will contribute a similar form displaced 120° apart. The gyroscopic torque about the power axis from the three flywheels combined is shown in Figure 2c. The zero degree position is that shown in Figure 3 and the successive values are for the indicated angular displacements of precession member 1 about the precession axis in the direction of the arrow in Figure 3. The sum of the three effects is a constant unidirectional torque (4a+4b+4c) as shown in Figure 2c.

For a given angular momentum about the spin axis the effective component perpendicular to the power axis is maximum when the spin axis is perpendicular to the power axis. In the mechanism shown in Figure 3, the maximum and the minimum spin speeds during the cycle about the precession axis are attained by each flywheel at the positions when its respective spin axis is perpendicular to the power axis, thus the largest possible average torque is developed for a given precession speed. If the gear 32a could be turned a small amount about the precession axis and rigidly fastened in this new position, each flywheel would reach its maximum and minimum spin speeds at positions when its respective spin axis would be at some angle less than 90° with respect to the power axis. Hence the maximum spin speed would not occur at the position with the maximum component of angular momentum for a positive torque, and the minimum spin speed would not occur at the position with the maximum component of angular momentum for a negative torque. The average torque about the power axis would, therefore, be decreased. If gear 32a were turned 90° about the precession axis from the position shown in Figure 3, the average gyroscopic torque about the power axis would be zero. From this discussion it is seen that it is possible to control the torque about the power axis by shifting the phase of the non-linear cylical variation of flywheel spin speed with respect to the period of rotation of the flywheels about the precession axis.

Figure 4:
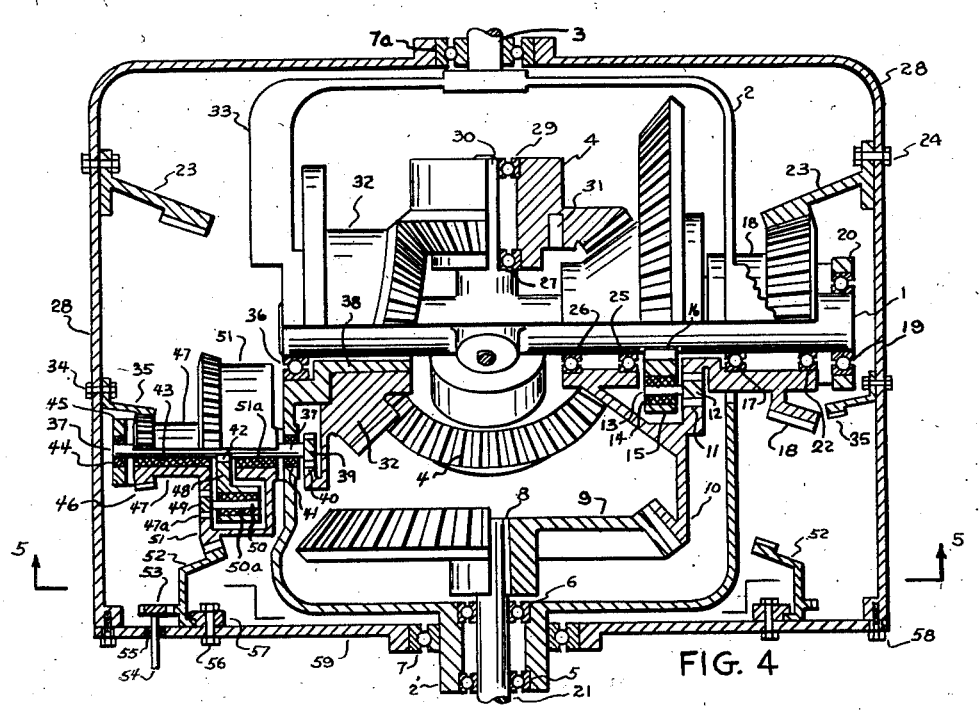
Figure 4 is a part-sectional plan of a preferred embodiment.
Figure 5:
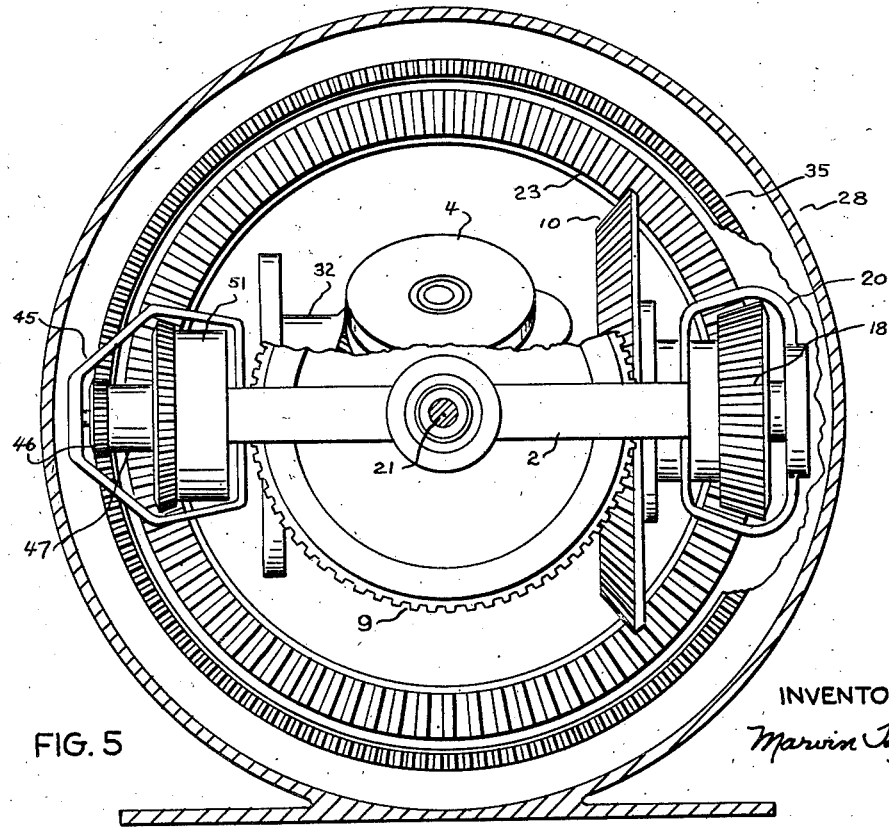
Figure 5 is a part-sectional elevation along line 5—5 in Figure 4, omitting gear 52.

Figures 4 and 5 are two views of a preferred embodiment of my invention, showing means for precession and, in addition, means for control of the output torque, Figure 4 being a part-sectional plan and Figure 5 a section along line 5—5 in Figure 4, omitting gear 52. The power input shaft 21 and the power output or driven shaft 3 are coaxially located along the power axis. The stationary housing for the mechanism consists of a casing 28 and end plate 59, said end plate being attached to said casing by some means such as a plurality of screws 58 which would allow disassembly of end plate 59 from casing 28 when required. The driven shaft 3 projects through the casing and is rigidly attached or integral with gimbal 2, this rigid assembly of shaft 3 and gimbal 2 being rotatably supported by anti-friction bearings 7 and 7a within the housing. A heavy mass of metal 33 rigidly attached or integral with gimbal 2 helps balance the rotating system about the power axis. Input shaft 21 projects through the gimbal and is rotatably supported by anti-friction bearings 5 and 6 within hub 2' which is integral with gimbal 2. Circular bevel gear 9 is securely attached to the inside end of shaft 21 by some means such as key 8. Gear 9 meshes with bevel teeth on a circular gear 10, which is rotatably supported by anti-friction bearings 25 and 26 on precession shaft 1. Precession shaft 1 is rotatably supported along the precession axis at a right angle to the power axis by bearings 36 and 19, bearing 36 being mounted in gimbal 2, and bearing 19 being mounted at the outer end of an extension 20 which is rigidly attached or integral with gimbal 2. In Figure 4, extension 20 is cut away to show the gears which are being carried on precession shaft 1. Gear 10 has internal teeth cut at 11 which mesh with a plurality of circular planet pinions 12. Each planet pinion 12 is rigidly attached or integral with a shaft 13 which is rotatably supported along an axis parallel to the precession axis by a bushing 14 within a thick cylindrical disc 15. Disc 15 is rigidly fastened to precession shaft 1 which passes through a circular opening at the center of said disc by some means such as key 16. Each pinion 12 also meshes with teeth on a circular gear 18 which is rotatably supported by anti-friction bearings 17 and 22 on precession shaft 1. Gear 18 also has bevel teeth meshing with stationary circular ring bevel gear 23, which is rigidly attached to casing 28 by some means such as a plurality of bolts 24.

Three radially projecting shafts 30 are integral with precession shaft 1 at the point where the power axis and the precession axis substantially intersect. Each shaft 30 projects out at a right angle to the precession axis and, furthermore, each shaft extension is displaced 120° about the precession axis from its neighbor. Rotatably mounted on each shaft extension is a flywheel 4, having bevel teeth distributed about a non-circular circumference at a variable pitch radius as previously indicated in Figure 3. Each flywheel 4 is rotatably supported at the same distance from the precession axis by bearings 27 and 29 on shaft 30. In Figure 4, one of the flywheels and its shaft 30 are omitted to simplify the view. In each flywheel are cavities 31 distributed in the vicinity of the maximum pitch radius for balance about the spin axis. The bevel teeth of the flywheels mesh with bevel teeth on circular gear 32, the bevel teeth on gear 32 being displaced parallel to the precession axis to mesh properly with the flywheels. Furthermore, the number of teeth on each flywheel is the same as that on gear 32. Gear 32 is rotatably supported on hub 38 which is integral with gimbal 2. Gear 32 also has internal teeth cut at 40 which mesh with circular pinion 39. Pinion 39 is rigidly attached or integral with shaft 37 which is parallel to the precession axis and rotatably supported by bearings 41 and 44, bearing 41 being mounted in gimbal 2 and bearing 44 being mounted at the outer end of an extension 45 which is rigidly attached or integral with gimbal 2. A circular gear 47 is mounted on a bushing 43 and is rotatably supported on shaft 37. Gear 47 has bevel teeth at 46 which mesh with the stationary circular ring bevel gear 35. Gear 35 is rigidly attached to the casing 28 by some means such as a plurality of bolts 34. Gear 47 also has teeth 47a which mesh with a plurality of circular planet pinions 49. Each planet pinion 49 is rigidly attached to or integral with shaft 50 which is rotatably supported parallel to shaft 37 in a bushing 50a within disc 48 which has a cavity for each bushing 50a. Centrally formed in disc 48 is an opening through which shaft 37 passes. Disc 48 is rigidly attached to shaft 37 by some means such as key 42. Pinions 49 also mesh with internal teeth on circular gear 51. Gear 51 is supported on bushing 51a, which is rotatably supported on shaft 37. Gear 51 also has bevel teeth meshing with bevel teeth on circular ring gear 52. Gear 52 is rotatably supported and confined against end plate 59 by ring 57. Ring 57 is rigidly attached to end plate 59 by some means such as a plurality of bolts 56. Gear 52 also has teeth meshing with a circular pinion 53 which is rigidly attached to or integral with control shaft 54. Control shaft 54 is mounted parallel to the power axis and is rotatably supported by bushing 55 within end plate 59.

Suitable collars and shoulders restrain all rotating members against endwise displacement as would be readily understood by those skilled in the art of mechanics.

The operation of the arrangement shown in Figures 4 and 5 is as follows. It will be assumed that the input shaft 21 is being driven at a constant speed from some source of power. The rotation of shaft 21 and gear 9 causes gear 10 to rotate about the precession axis. At the beginning, shaft 3 and gimbal 2 are motionless, hence gear 18 is held motionless by stationary gear 23 and gear 32 is held motionless by its attached gear train as will be explained later. The rotation of gear 10 acting through pinions 12, disc 15 and key 16 causes the precession shaft 1 to rotate about its axis. As precession shaft 1 rotates, it carries flywheels 4 about gear 32 at a constant precessional speed. The variable pitch radius of the flywheels gives each flywheel the desired cyclical variable spin speed. The gyroscopic effect due to the variable spin speed and precessional rotation of the three flywheels will develop a constant unidirectional torque about the power axis. This torque will be transmitted from the flywheels through the shaft extensions 30, and the precession shaft 1 to gimbal 2 and driven shaft 3. If the external load is sufficiently great, the torque developed will not be enough to rotate shaft 3. However, this mechanism will still be capable of exerting a torque on the load for this zero output speed condition, while the prime mover can keep rotating at high speed. If the torque developed about the power axis can overcome the load, shaft 3 and gimbal 2 carrying precession shaft 1 and control shaft 37 and their mounted gears will all begin rotating about the power axis. Since gear 10 is mounted on precession shaft 1, it will also be carried about the power axis, hence the rotation of gear 10 about the precession axis will change, becoming greater if its rotation about the power axis is in a direction opposite to that of gear 9, and smaller if it is in the same direction as that of gear 9. However, as shaft 1 rotates about the power axis, it will cause gear 18, which is meshing with stationary gear 23, to rotate about the precession axis. This motion of gear 18 will act through pinions 12 to compensate for the change in the speed of gear 10 about the precession axis. The speed of disc 15 about the preecssion axis will, therefore, be constant regardless of the speed of the driven shaft. Hence, the precession speed and spin speed of the flywheels will be independent of the speed of the driven shaft and the torque on the driven shaft will remain constant.

Gear 52 can be held stationary by control shaft 54 acting through pinion 53 so that when the gimbal 2 is motionless, gear 47 is held motionless by stationary gear 35 and gear 51 is held motionless by gear 52. Therefore, pinions 49, disc 48, shaft 37, pinion 39 and hence gear 32 are all held motionless during the zero output speed condition. As driven shaft 3 and gimbal 2 carrying shaft 37 all commence to rotate about the power axis, gear 47 is forced to rotate about shaft 37 and gear 51 is also forced to rotate about shaft 37 in a direction opposite to that of gear 47. While gear 52 is held motionless by the control shaft 54, the speeds of rotation of gear 47 and gear 51 will be such as to rotate pinions 49 as if they were merely idlers without compelling disc 48 to rotate about shaft 37. Hence, during rotation of shaft 3 and gimbal 2 about the power axis, gear 32 will still be held from rotating about the precision axis by control shaft 54. When control shaft 54 is rotated by an operator, it will cause gear 52 to turn about the power axis. This will add or subtract a displacement to the rotation of gear 51 depending upon the direction in which the control shaft 54 is rotated. This increment of motion will be transmitted through pinions 49, disc 48, shaft 37 and pinion 39 to gear 32. Rotation of gear 32 about the precession axis by control shaft 54 will shift the phase of the non-linear variation of spin speed with respect to the cycle of precession, thus changing the positions at which the maximum and minimum flywheel spin speeds occur in their cycle about the precession axis. This change in position will change the torque on the driven shaft. At any time while the unit is functioning, the torque on the driven shaft will be a function of the speed of input shaft 21 and the position of control shaft 54 only. The speed of the driven shaft will be a function of this torque and the load conditions.

In Figure 4, it will be noted that gear 32 has been rotated to the position for which the torque output of the device is zero. This has been done only to more clearly show the shape of gear 32.

Figure 6:
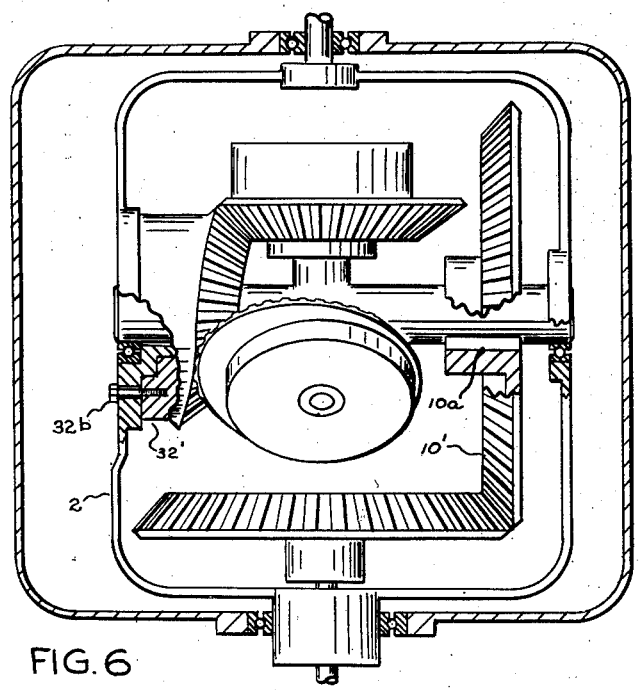
Figure 6 is a part-sectional plan of another preferred embodiment.

It will be understood that the above description covers only one preferred embodiment of my invention as shown in Figures 4 and 5. The spirit of my invention lies in the continuous variation of flywheel spin speed during a precessional motion of the flywheels to develop a smooth, unidirectional power output torque. The embodiment of this invention as shown in Figures 4 and 5 contains in addition to the basic idea, the gears 12, 18 and 23 to maintain precession and spin speed independent of driven shaft speed, and gears 35, 39, 47, 49, 51, 52 and 53 to control the torque on the driven shaft while the driving and the driven shaft are rotating. My invention could successfully be embodied in a construction which omitted either or both of these gear trains. Figure 6 is a part-sectional plan showing a simplified embodiment.

In Figure 6, gear 10' is rigidly attached to precession shaft 1 by some means such as a key 10a. Gear 32' is rigidly attached to gimbal 2 by some means such as a plurality of screws 32b. In this embodiment, the torque capacity of the unit could be easily changed by stopping the machine, removing screws 32b, rotating gear 32' to a new position, and replacing screws 32b. Gear 32' is shown in the zero output torque position for the sake of clarity only. This embodiment would have the feature of automatic and continuous variation of output torque to suit load requirements. As the speed of the driven shaft would change, the rotational speed of gear 10' about the precession axis would also change. This would alter the precession and hence the spin speeds of the flywheels, changing the torque developed about the power axis.

The embodiment shown in Figures 4 and 5 merely shows one method of controlling the torque on the driven shaft while the mechanism is in operation. Different means for doing this could easily be devised and still fall within the spirit of my invention. Also, the sizes of the gears in the differential gear train which keeps the precession speed independent of the driven shaft speed could be altered to give different desired characteristics of torque on the driven shaft with different driven shaft speeds. Additional gear trains may be constructed in the mechanism between the power source and the input shaft and/or between the driven shaft and the load. Furthermore, the direction of power transmission could be reversed, i. e., the driving shaft 21 becoming the driven shaft and the driven shaft 3 becoming the driving shaft, without departing from the spirit of my invention. In this form the gyroscopic torque would be developed about the precession axis and transmitted through gear 9 about the power axis. Other means of varying the spin speed during the precession cycle, such as by use of a Scotch yoke mechanism, might be used and still fall within the spirit of my invention. Also, the number of flywheels used need not always be three such as I have described.

Therefore, while I have illustrated specific forms of the invention, it is to be understood that I do not intend to limit myself to these exact forms but intend to claim my invention broadly as defined by the appended claims.

I claim:

1. In a power transmission device, a power input member, a power output member rotatable about an axis, and an operative connection between said members including a gyroscopic mass, a structure supporting said mass so that it is capable of simultaneously rotating about a power axis coincident with the axis of rotation of said power output member, rotating about a precession axis perpendicular to said power axis, and spinning about a spin axis perpendicular to said precession axis, a first operative connection between said power input member and said mass for rotating said mass about said precession axis and a second operative connection between said power output member and said mass for spinning said mass about said spin axis, said second operative connection being non-linear in nature cyclically with respect to the period of rotation of said mass about said precession axis, a control member and an operative connection between said control member and said second operative connection to shift the phase of the cyclical non-linearity of said second operative connection with respect to the position of said mass about said precession axis.

2. In a power transmission device, a power input member, a power output member rotatable about an axis, and an operative connection between said members including a plurality of gyroscopic masses, a structure supporting said masses so that each is capable of simultaneously rotating about a power axis coincident with the axis of rotation of said power output member, rotating about a precession axis perpendicular to said power axis, and spinning about its own spin axis perpendicular to said precession axis, the spin axes of said masses being angularly displaced with respect to one another about said precession axis, a first operative connection between said power input member and said masses for rotating said masses about said precession axis and a second operative connection between said power output member and said masses for spinning said masses about their respective spin axes, said second operative connection being non-linear in nature cyclically with respect to the period of rotation of said masses about said precession axis, an external control member and an operative connection between said control member and said second operative connection effective to shift the phase of the cyclical non-linearity of said second operative connection with respect to the position of said masses about said precession axis.

3. In a power transmission device, a supporting frame, a gimbal mounted therein so as to be rotatable about a power axis, a power output shaft operatively connected to said gimbal for simultaneous rotation therewith, a precession shaft rotatably mounted in said gimbal so as to extend perpendicular to said power axis, said shaft defining a precession axis, a power input shaft, and an operative driving connection between said power input shaft and said precession shaft for rotating the latter, a plurality of gyroscopic masses mounted on spin shafts and rotatable with respect to spin axes, said spin axes being perpendicular to said precession axis and angularly disposed with respect to one another about said precession axis, said spin shafts being connected to said precession shaft for rotation therewith, each of said masses having gear teeth distributed along a non-circular circumference, and another gear mounted in said gimbal and rotatable about said precession axis, said other gear having gear teeth formed on an undulating surface, said gear teeth simultaneously meshing with the gear teeth on all of said masses, whereby rotation of said power input shaft will cause said masses to rotate about said precession axis and the mesh between the gear teeth on said masses and the gear teeth on said other gear will cause said masses to spin at varying speeds cyclically related to their position about the precession axis, an external control member and an operative connection between said control member and said other gear for controllably positioning said other gear about said precession axis with respect to said gimbal.

4. The power transmission device of claim 3 in which the operative driving connection between said power input shaft and said precession shaft for rotating the latter comprises a planetary gear unit the output planet gear carrier of which is drivingly connected to said precession shaft, said power input shaft being operatively connected to said planetary gear unit so as to constitute one input thereto, a reaction gear for said planetary gear unit, said reaction gear being operatively connected to said gimbal and to said supporting frame.

5. In a power transmission device, a supporting frame, a gimbal mounted therein so as to be rotatable about a power axis, a power output shaft operatively connected to said gimbal for simultaneous rotation therewith, a precession shaft rotatably mounted in said gimbal so as to extend perpendicular to said power axis, said shaft defining a precession axis, a power input shaft, an operative connection for driving the precession shaft comprising a planetary gear unit the output planet gear carrier of which is drivingly connected to said precession shaft, said power input shaft being operatively connected to said planetary gear unit so as to constitute one input thereto, a reaction gear for said planetary gear unit, said reaction gear being operatively connected to said gimbal and said supporting frame, a plurality of gyroscopic masses mounted on spin shafts and rotatable about spin axes, said spin axes being perpendicular to said precession shaft and angularly disposed with respect to one another about the precession axis, said spin shafts being connected to said precession shaft for rotation therewith, each of said masses having gear teeth distributed along a non-circular circumference, and another gear mounted in said gimbal and rotatable about said precession axis, said other gear having gear teeth formed on an undulating surface, said gear teeth simultaneously meshing with the gear teeth on all of said masses.

6. In a power transmission device, a supporting frame, a gimbal mounted therein so as to be rotatable about a power axis, a power output shaft operatively connected to said gimbal for simultaneous rotation therewith, a precession shaft rotatably mounted in said gimbal so as to extend perpendicular to said power axis, said shaft defining a precession axis, a power input shaft, and a first operative driving connection between said power input shaft and said precession shaft for rotating the latter, a plurality of gyroscopic masses mounted on spin shafts and rotatable with respect to spin axes, said spin axes being perpendicular to said precession axis and angularly disposed with respect to one another about said precession axis, said spin shafts being connected to said precession shaft for simultaneous rotation therewith, and a second operative connection between said power output member, and said masses for spinning said masses about their respective spin axes, said second operative connection being non-linear in nature cyclically with respect to the period of rotation of said masses about said precession axis.

7. In the power transmission device of claim 6, a control member and an operative connection between said control member and second operative connection effective to shift the phase of the cyclical non-linearity of said second operative connection with respect to the position of said masses about said precession axis.

MARVIN TAYLOR.

References Cited in the file of this patent

UNITED STATES PATENTS

| Number | Name | Date |
| --- | --- | --- |
| 1,544,834 | Gooder | July 7, 1925 |
| 1,758,252 | Gardner | May 13, 1930 |
| 2,045,584 | Cotanch | June 30, 1936 |
| 2,052,507 | Walton | Aug. 25, 1936 |
| 2,296,654 | Stein | Sept. 22, 1942 |

FOREIGN PATENTS

| Number | Country | Date |
| --- | --- | --- |
| 414,693 | Great Britain | Aug. 7, 1934 |